United States Patent
Jacino et al.

[11] Patent Number: 6,074,582
[45] Date of Patent: Jun. 13, 2000

[54] FLOW REGULATOR FOR GLASS BREAK REPAIR APPARATUS

[76] Inventors: Gerald Jacino, 85-19 118 St., Kew Gardens, N.Y. 11415; Anthony Jacino, 17 Normandie La., East Moriches, N.Y. 11940

[21] Appl. No.: 09/123,862

[22] Filed: Jul. 28, 1998

Related U.S. Application Data

[60] Provisional application No. 60/055,822, Aug. 15, 1997.

[51] Int. Cl.$^7$ ................................................. B32B 35/00
[52] U.S. Cl. .............................. 264/36.21; 425/13; 425/12
[58] Field of Search ................... 425/12, 13; 264/36, 264/36.21; 156/94; 427/140

[56] References Cited

U.S. PATENT DOCUMENTS

| | | | |
|---|---|---|---|
| 3,765,975 | 10/1973 | Hollingsworth | 156/94 |
| 3,993,520 | 11/1976 | Werner et al. | 156/94 |
| 4,032,272 | 6/1977 | Miller | 425/12 |
| 4,047,863 | 9/1977 | McCluskey et al. | 425/13 |
| 4,280,861 | 7/1981 | Schwartz | 156/382 |
| 4,597,727 | 7/1986 | Birkhauser, III | 425/12 |
| 4,961,883 | 10/1990 | Jacino et al. | 425/12 |

*Primary Examiner*—Robert Davis
*Assistant Examiner*—Thukhanh T. Nguyen
*Attorney, Agent, or Firm*—Auslander & Thomas

[57] ABSTRACT

In the repair of breaks in glass with a syringe to accumulate vacuum and pressure, an improved flow regulator is engaged to protect against the contamination of the tubing, syringe and the valve. The configuration of the flow regulator causes air bubbles formed in the selected glass repair resin to burst within the flow regulator

11 Claims, 2 Drawing Sheets

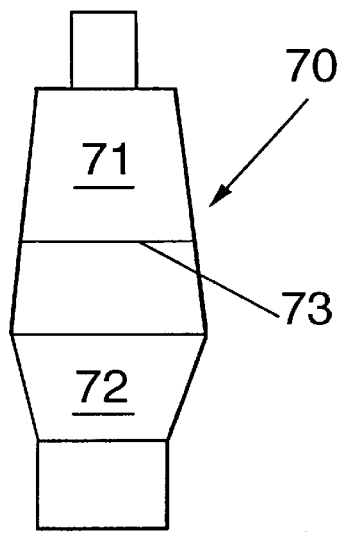
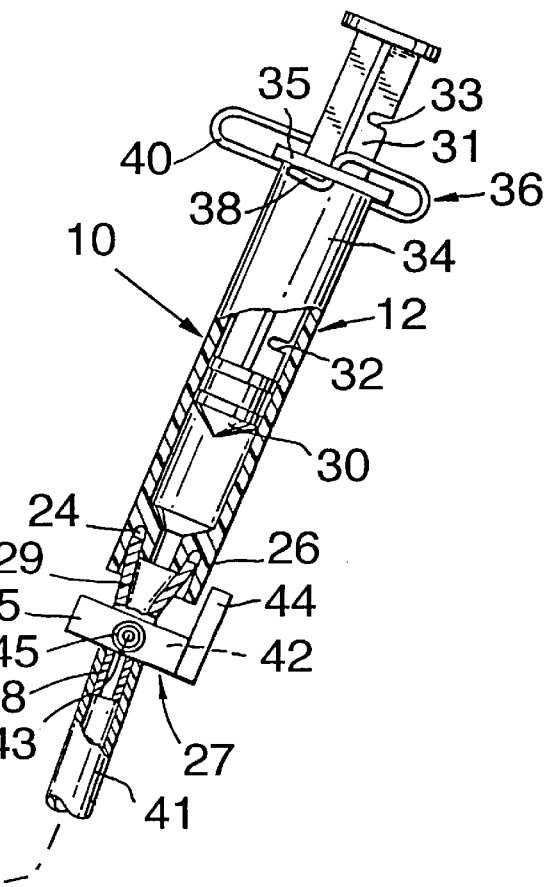
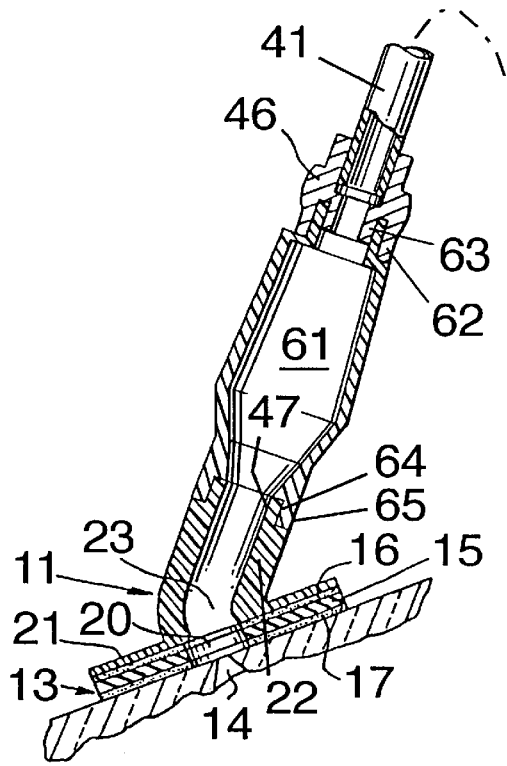

FLOW REGULATOR FOR GLASS BREAK REPAIR APPARATUS

The present invention is a continuation of Provisional Application Ser. No. 60/055,822, filed Aug. 15, 1997.

BACKGROUND OF THE INVENTION

The present invention relates to an improved flow regulator for glass break repair apparatus of U.S. Pat. No. 4,961,883. The high vacuum of the syringe enabled by the system of U.S. Pat. No. 4,961,883 caused a bubbling of resin out of the chamber integral to the pedestal when in use. The resin fouled the reusability of the parts of system by resin hardening outside of the pedestal chamber.

A solution to the problem included the interposition of a discardable barrel to catch the overflow. The barrel reduced the fouling of the system but did not satifactorily abate the problem of resin bubbling into the system.

The prior art system works generally as follows; glass breaks or cracks, such as in automobile windshields, or even plate glass, mar the visibility through the glass, but oftentimes do not affect the usability of the glass. In many instances, such breaks or cracks themselves can be repaired, substantially restoring the visibility through the glass, obviating very expensive and time-consuming replacement of the entire glass which includes the break or crack.

One of the problems in glass breaks or cracks is that the rough edges of the area and the crack striations refract light in patterns different from the normal refraction of the glass, impeding or destroying the normal visibility of the glass.

The problems of glass breaks are substantially the same in automobile windshields or plate glass insofar as visibility is concerned. The main difference between a windshield and plate glass is that a windshield or other automobile glass is made of safety glass.

Safety glass is usually a lamination of two plates of glass sandwiching a transparent binder. A crack in a windshield usually only affects the outer plate of the lamination and does not go through the entire lamination.

A crack in the plate glass differs primarily in that it goes through the entire plate, since there is no lamination.

It has been found that glass breaks can be filled with transparent resins which protect the formerly broken areas and which substantially restore the visibility to the repaired area. Such repair has required complicated mounting devices, complicated pumps for drawing air and creating pressure and other expensive equipment. The equipment was also so complicated that only experienced operators could use such equipment. Notwithstanding equipment of the past and professional repairs, oftentimes striations of somewhat irregular cracks were unable to be properly repaired because of the difficulty of getting the resin to penetrate the striations of the crack.

Devices of the past required complex and expensive heat applications, ultra sound, pressure to place the devices or vacuum mounted jigs to position repair apparatus, among other things.

In the past, an improved system included a simple pedestal mountable over a break. The pedestal received a syringe which was sealed to the pedestal and was used to fill the crack with transparent resin. Where the break was through the entire thickness of the glass, particularly with plate glass, it was necessary to seal the other side of the glass in order to get proper resin penetration. In the past, the simplicity of the use of a syringe with a pedestal and its efficiency for pumping and drawing was a great advance in the technology.

The flange on the pedestal served as an effective interface between the seal and the glass with the break.

The prior art invention included the use of a three-way valve with a syringe in the pumping system, instead of the prior art pin valve used in conjunction with a syringe. The syringe is an unexpectedly more effective vacuum accumulating tool instead of a one-shot pump. Now one can continue to draw vacuum and hold it in a valve configuration. To some extent pressure was able to be accumulated in the past. One can now draw vacuum, vent the syringe, hold the vacuum, then close the syringe, draw more vacuum and vent the syringe. The prior invention gives greater flexibility over what has been available before, using a simple syringe. The prior invention used a simpler mechanism for effectively drawing vacuum and to some extent, accumulating pressure.

The accumulation of vacuum created a new problem. Air from the break caused resin to bubble into the tube, limiting the effective use life of the apparatus.

The air bubble problem was met by the use of a discardable barrel. The barrel did not satisfactorily solve the problem of fouling of the system.

DESCRIPTION OF THE RELATED ART

U.S. Pat. No. 4,597,727 shows a prior art device employing a syringe. The patent also discloses a complex pumping device to be attached to a vacuum held device, vacuum held over a glass crack. The pump includes a complex arrangement of a pressure gauge and adjustable valves to switch the pump from drawing vacuum to pumping pressure. The pump may be attached through a tube to the element juxtaposed to the break in the glass. This is all distinguished from the simple use of the pedestal attached to the glass and the syringe of the present invention.

U.S. Pat. No. 4,280,861 is another prior art device employing a complicated vacuum held cup to engage EL syringe with resin for repairing glass. The device has a complicated multiple pump and valve system for applying or accumulating vacuum or pressure in a special T fitting which also supports the syringe with the resin.

U.S. Pat. No. 3,765,975 also provides a vacuum fitting for holding a block juxtaposed to a break in a manner different from the present invention and does not permit the multiple drawing or pumping of the present invention.

U.S. Pat. No. 3,993,520 discloses a complex vacuum held device for repairing glass which employs a syringe for the injection of the resin.

U.S. Pat. No. 4,032,272 is another typical device, held by vacuum over the break in the glass U.S. Pat. No. 4,047,863 shows vacuum and pumping systems, but neither shows nor suggests the flow regulator of the present invention for the syringe and valve system.

SUMMARY OF THE INVENTION

According to the present invention, a new flow regulator is engagable at the end of the pedestal. The flow regulator has a chamber which receives the bubbling resin and allow the resin bubbles to burst without resin contaminating the apparatus. The invention is an improvement over U.S. Pat. No. 4,961,883 when combined with a discardable prior art barrel.

The improved flow regulator of the present invention connects to the pedestal resin chamber and controls the way vacuum and pressure act upon the resin in the pedestal chamber. Since the syringe is capable of accumulating a powerful vacuum, the added vacuum creates a significant amount of air bubbles in the pedestal chamber, forcing the resin to travel upward in the form of bubbles.

When pulling a vacuum, air is pulled through the sealed off pedestal, creating air bubbles in the resin chamber and causing the resin to travel upwards with the bubbles into the flow regulator of the present invention. The flow regulator of the present invention traps the resin, allowing the air bubbles to burst, preventing the resin from entering the system. The prior art barrel acted as a secondary reservoir, but was not able to degas the overflowing resin as effectively as the flow regulator of the present invention.

BRIEF DESCRIPTION OF THE DRAWING

Although such novel feature or features believed to be characteristic of the invention are pointed out in the claims, the invention and the manner in which it may be carried out may be further understood by reference to the description following and the accompanying drawings.

FIG. 2 is a partially cut away section of a broken glass, with a mounted pedestal and a remote syringe and valve connected to the pedestal by tubing, showing the flow regulator of the present invention.

FIG. 3 is a front elevation of another embodiment of the present invention.

DESCRIPTION OF THE FIGURES

Figure 1:
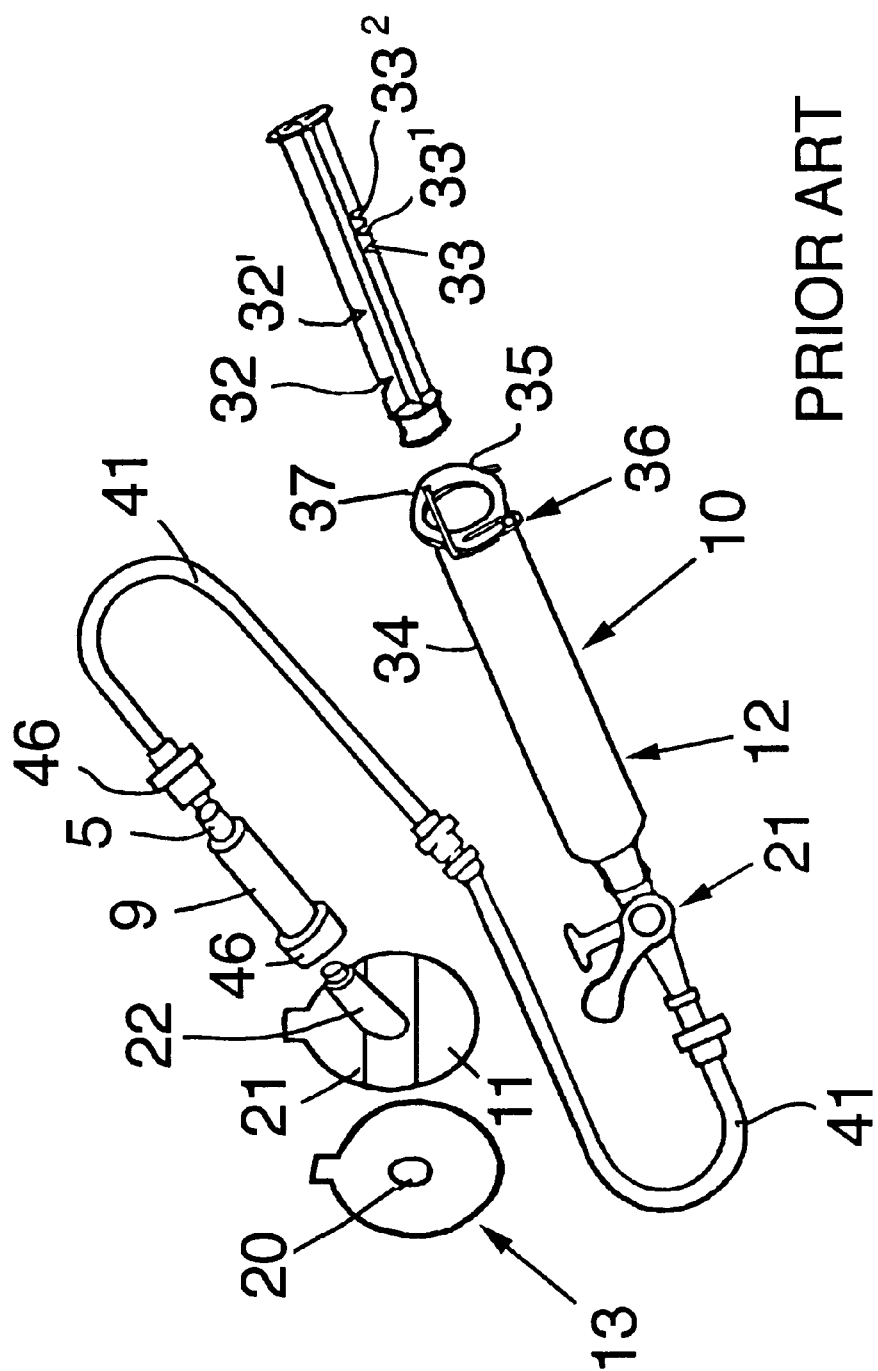
FIG. 1 is a broken glass repair apparatus of the prior art with a pedestal and a remote syringe, tubing and a valve with the prior art barrel exploded from the pedestal.

Referring now to the figures in greater detail, where like reference numbers denote like parts in the various figures.

The glass repair apparatus 10 comprises a pedestal 11 and a syringe 12. The pedestal 11 is mounted on a seal 13 which may be elastomeric, which may be centered over a break 14 in a glass.

The seal 13 includes several lamina. There is a basic layer 15 of an air impermeable substance such as rubber, with two adhesive layers 16 and 17. The adhesive layer 17 may be covered by a protective release paper (not shown). As can be seen in FIGS. 1 and 2, there is a central opening 20 in the seal 13.

The pedestal 11 preferably has a flange portion 21 and a neck 22 which includes a chamber 23.

The syringe 12, preferably of plastic, is provided with a collar 26 and a recessed portion 24 as shown in FIG. 2. A valve 27, as shown in FIG. 2, may be friction fit and/or threadedly engaged over the recessed portion 24 and between the collar 26. The syringe 12 has a conventional plunger 30 on a stem 31. The stem 31 usually has an "X" cross section and preferably includes a lower notch 32 and an upper notch 33.

As shown in FIG. 1, there is an additional lower notch 32[1] and additional upper notches 33[1] and 33[2] on the stem 31.

On the body 34 of the syringe 12, the conventional flange 35 preferably includes latch 36.

The latch 36 can be seen in FIGS. 1 and 2 pivotable through an opening 37 in the flange 35 and has a lower arm 38 biased against the body 34 as shown in FIG. 2. The upper arm is formed into a keeper 40 folded over the flange 35 to limit the motion of the latch 36. The bias of the latch 36 causes it to engage the notches 32 and 33, according to the position of the stem 31. Disengagement is obtained by rotation of the stem 31 one way or the other, which flexes the latch 36 on the unnotched portion of the stem to cause disengagement.

The tube 41 is shown in FIG. 1, engaging the neck 5 of a prior art barrel 9, which is attached to the pedestal 11. The tube 41 is engaged to the end 28 of the valve 27.

In repairing a break on a windshield, for instance, the seal 13 is preferably centered over the center of the break.

Oftentimes breaks, particularly in windshields, form a pin point with a loose cone of glass inside. As long as the seal 13 can form an airtight seal between the open cracks in the glass, the apparatus and method are effective.

Once the seal 13 is placed, the pedestal 11 is engaged with the chamber 23 over the opening 20 in the sea 13. The resin is then placed in the chamber 23.

The resin is selected as one to be clear when dried. Various resins may be used, such as a transparent epoxy with a hardener mixed in. This mixture oftentimes is gauged not to cure too fast, so that there is enough time to cycle resin into a break. Also employable are single component clear resins, such as acrylic resins with photo initiators, which can then be exposed to ultraviolet light once set in place and cured thereby.

The valve 27 is threadedly or frictionally engaged over the recessed portion 24 and collar 26 of the syringe 12. The upper portion 29 opens to a barrel 25. Rotatably engaged within the barrel 25 is a rotor 42, as shown in FIGS. 2. The rotor 42 has a T-opening 43 and a handle 44. There is another opening 45 from the barrel 25.

When the handle 44 is in substantially horizontal position the T-opening 43 opens through the upper portion 29 to the inner portion of the valve end 28. The third opening of the T is against the inside of the barrel 25. Thus, depression of the stem 31 and the plunger 30 pumps pressure through the valve 27, which may pass through the tube 41.

When the handle 44 is in one position, opening of the T-opening 43 is open to the inside of the body 34 of the syringe 12. Another opening of T-opening 43 is open to the valve 27 opening 45, while the last opening of the T-opening 43 opens to the closed portion of the barrel 25. Thus, the valve 27 ir that position vents the syringe to atmosphere, or intakes from atmosphere, depending upon the movement of the stem 31 and plunger 30.

With the handle 44 substantially vertical, the T-opening 43 opens to the end 28 of the valve 27, and to the opening 45, with the third end of the T-opening 43 adjacent to the closed end of the barrel 25. Thus, the inside of the body 34 is closed off and the valve 27 is vented to the atmosphere and to the valve end 28 and/or tubing 41.

As shown in FIG. 1, the tubing 41 is connected by a cap 46 to the end of the barrel 9 of the prior art. The tube 41 is in turn connected to the end. 28 of the valve 27. There may be intermediate caps 46. The other end of the prior art barrel 9 is connected to the recessed portion of the end of the neck 22 of the pedestal 11 with a cap 46.

The air in the glass break must be removed in order to get the resin to flow into the break and also fill the striation of the break.

The first step is to move the handle 44 into a vertical position, then depress the plunger 30 as far as it can go, then move the handle 44 into horizontal position, then withdraw the plunger 30 and engage the notch 32 with the latch 36. Where the pedestal 11 is transparent, the air from the break can be seen bubbling through the resin.

In order to increase the vacuum, the valve 27 now enables further drawing of vacuum. The handle 44 is again moved to its vertical. The stem 31 is released from its engagement with the latch 36 and plunger 30 on the stem 31 is depressed within the syringe. By doing this, air within the body 34 of the syringe 12 is expelled through the opening 43 and through the opening 45. The handle 44 is then again moved horizontally to the position, and the plunger 30 on the stem 31 again withdrawn and the lower notch 32 engaged with the latch 36, repeating the first procedure.

By this procedure, a cumulative drawing of vacuum can maximize the amount of air drawn from the crack and to speed up the procedure.

After ten to fifteen minutes, or after the bubbles seem to diminish, pressure may be applied.

The handle 44 is moved to a horizontal position. The plunger 30 is then pushed downward and locked, held at the stem 31 in notch 33. The handle 44 is then moved to a vertical position, venting the opening 43 to the atmosphere so that the plunger 30 on the stem 31 may be withdrawn after releasing the engagement of the latch 36 with the notch 33. The handle 44 is then again moved to a horizontal position. The amount of pressure that can be applied is somewhat limited since the turning of the handle 44 to the horizontal position releases a back pressure to fill the body 34 of the syringe 12. The plunger 30 on the stem 31 is then depressed with the notch 33 again being engaged with the latch 26, so that pressure may be reapplied to force the remaining resin into the break and striations. The procedure may be repeated until satisfactory results have been obtained.

Selected use of the vacuum and pressure may be applied, as deemed necessary. Accumulations of drawn vacuum, reapplication of pressure and some accumulating of pressure may be selected to need.

The vacuum cycle both draws out the air and replaces it with the resin. The vacuum cycle will get most of the resin into the break and even into the striations. The resin, once in the striations, gives a uniform refraction and generally clear visibility through the striation and break.

Much of what has to be done can be determined by inspection of the break.

When using an epoxy resin with a hardener, the resin continually thickens. Ultimately, the vacuum or pressure has little or no effect. At this time, the syringe 12 may be removed. When using epoxy resin, it may be desirable to leave the pedestal 11 on until the resin is fully cured. The chamber 23 then acts as a reservoir to hold the resin and mold a bead (not shown). When the resin is fully cured, the pedestal 11 is removed and a bead is left. The bead can be removed by cutting with a razor, leaving a smooth surface with the glass and good visibility through the repaired break.

When using a single component acrylic resin with a photo initiator, once the resin has been satisfactorily engaged in the break, the resin may be treated with ultraviolet light in order for it to harden in place and complete the repair.

It has been found that the tube 41 will neither collapse nor burst under high vacuum or pressure. The tube 41 can extend for a substantial length, thus, enabling the placement of the pedestal 11 over the glass break, then being able to carry the syringe 12 the necessary distance, such as to the inside of a vehicle, so that the break 14 and the resin being introduced may be observed from the other side of the glass, while the procedure of carrying out the repair is performed remotely. This gives a more accurate control over the repair and enables better gauging of vacuum drawing and pressure applying in accordance with the needs of the particular break.

Where the hole is through the entire glass, a closure to the break in the glass is provided by a sealing patch applied on the opposition surface of the break. It is preferable to have a support over the patch so that the vacuum cycle does not indent part of the patch into the break, leaving a mark in the repair. The support may be a piece of aluminum or steel, for instance, or even a piece of Masonite®. Masonite® is a registered trade mark for a fiberboard.

The seal 13 is preferably preapplied to the pedestal 11. In use, it is preferable to have a release paper (not shown) over the adhesive 17, the release being removed at the time that the pedestal is placed over the break 14 at the seal opening 20.

It is desirable to have at least the valve 27, the tubing 41 and the syringe 12 reusable as a convenience and because of their cost. Once resin gets in the these parts they are at least difficult to clean if usable at all.

The pedestal 11 is less of a problem, it may be discarded or cleaned and a new seal 13 applied for the purpose of reuse if desired.

The problem of contamination has been pervasive with regard to the glass repair apparatus 10 used, as disclosed in U.S. Pat. No. 4,961,883 and also with the glass repair apparatus 10 used in the prior art, as shown in FIG. 1 with the barrel 9.

In the prior art, air bubbles encased in resin crawled up the tubing 41 or when the barrel 9 was used, the resin still crawled through the barrel 9 into the tubing 41.

The high vacuum created by the syringe 12 drew more air out of the break and into the resin in the pedestal chamber 23. Resin bubbles entering the barrel 9 oftentimes clung to the inside wall of the barrel 9 without breaking and into the tube 41, further powered by the high vacuum, generated by the syringe 12.

The inner volume of the barrel 9, while substantially greater than the volume of the pedestal chamber 23, did not solve the problem of resin fouling.

The flow regulator 60 of the present invention, as shown in FIG. 2, solves the problem of the resin, under vacuum, bubbling out of the chamber 23 and without fouling the apparatus.

The flow regulator 60 of the present invention is substantially the same length as the barrel 9. It has an internal chamber 61, a connector end 62 to connect with the neck 63 of the cap 46 on the tube 41 and another connector end 64 to connect with the recessed end 47 of the pedestal 22.

The entire length of the flow regulator 60, from end to end in a preferred embodiment, is approximately two and a half inches, approximately the same as the length of the barrel 9. The inside diameter of the chamber 61 is approximately twice the diameter of the barrel 9. The inside diameter of the chamber in the barrel 9 is approximately one quarter of an inch and the inside diameter of the chamber 61 is approximately one half an inch. The increased width and volume of the chamber 61 of the flow regulator 60 enables the bursting of the resin bubbles without a overflow of resin from the chamber 61.

The inside diameter of the chamber 61 is selected to be in excess of the diameter of a resin bubble as it passes into the chamber 61.

The viscosity of the resins used in glass break repair a substantially similar. The diameter of the chamber 61 is selected to be greater than the usual bubble formed by air bubbling through the resin. Thus, as the vacuum created by the syringe 12 draws air through the resin the bubbles burst before engaging the inner walls of the chamber 61 and creeping up the chamber 61.

Were the resin to be changed to a more viscous one, a chamber 61 diameter may have to be selected, in order to accommodate the new bubbles so that they can burst rather then engage the inner wall of the chamber 61, and then creep up the inside of the chamber 61 to ultimately foul the apparatus.

As shown in FIG. 3, a flow regulator 70 comprises a first body portion 71 and a second body portion 72, integrally joined at a seam 73 by adhesive, fusion, friction interfit, any combination thereof, or other means well know in the art. The construction is a matter of convenience of manufacture rather than a change in the nature of the present invention.

The terms and expressions which are employed are used as terms of description; it is recognized, though that various modifications are possible.

It is also understood the following claims are intended to cover all of the generic and specific features of the invention herein described; and all statements of the scope of the invention which as a matter of language, might fall therebetween.

What is claimed is:

1. Improved apparatus for repairing a break in glass enabling a syringe to accumulate vacuum and pressure comprising a pedestal, said pedestal including a flange portion, a chamber in said pedestal, said pedestal chamber having two openings, one said opening in said flange portion, said other opening airtightly engaged with a syringe, said pedestal chamber of sufficient size to be a reservoir for a selected glass repair resin, adhesive sealing means to seal said pedestal at said flange in airtight engagement over a break in glass with said pedestal chamber in airtight engagement with said glass break and said syringe, said syringe including a plunger with a stem; retaining means to retain said stem in a selected fixed position in relation to the body of said syringe; and valve means in airtight engagement between said pedestal chamber and said syringe, said valve means including a station to seal said syringe and vent said pedestal chamber to the atmosphere; and a station to airtightly engage said syringe with said pedestal chamber, whereby a downward plunger motion pressurizes said resin and an upward plunger motion creates a vacuum between said break and said plunger, said valve means further including a position to airtightly seal said pedestal chamber and vent said syringe to the atmosphere, whereby a downward plunger motion vents air to the atmosphere, whereby said syringe is selectively actuatable to accumulate vacuum and pressure for the infusion of said selected glass repair resin into a break in glass and, a flow regulator, said flow regulator airtightly engaged between said pedestal chamber and said syringe, said flow regulator including a first connector end; a second connector end; and a flow regulator chamber therebetween, and said flow regulator chamber selected to have a diameter in excess of the largest diameter of an unburst air bubble in said selected glass repair resin.

2. The invention of claim 1 wherein said flow regulator chamber has an internal end to end length in excess of the largest diameter of any said unburst air bubble in said selected glass repair resin.

3. The invention of claim 1 wherein said flow regulator has an end to end length of approximately two and one half inches.

4. The invention of claim 1 wherein said flow regulator comprises a first body portion and a second body portion, said first and second body portions integrally joined.

5. The invention of claim 4 wherein said first body portion and second body portion are joined by fusion.

6. The invention of claim 4 wherein said first body portion and second body portion are joined by an adhesive bond.

7. The invention of claim 4 wherein said first body portion and second body portion are joined by a friction interfit.

8. An improved method for enabling a syringe to accumulate vacuum and pressure for repairing a break in glass comprising the step, of providing a pedestal, said pedestal including a flange portion; a chamber of sufficient size to act as a reservoir for a selected glass repair resin; and said chamber having two openings, one said opening in said flange portion and said other opening airtightly engagable with a syringe, providing said syringe; including a plunger with a stem; and stem retaining means; and a body including an upper portion; and a lower part, providing valve means, engaging said valve means in airtight engagement between said pedestal chamber and said syringe, adhesively sealing said pedestal at said flange in airtight engagement over a break in glass with said chamber in airtigtht engagement with said glass break, providing a selected glass repair resin in said chamber, and providing a flow regulator, said flow regulator airtightly engaging said syringe and interposed between said pedestal chamber and said syringe, said flow regulator including a first connector end; a second connector end; and a flow regulator chamber therebetween, and said flow regulator chamber selected to have a diameter in excess of the largest diameter of an unburst air bubble in said selected glass repair resin including the steps of:

(a) actuating said plunger on said stem to move said plunger to the lower part of the body of said syringe, (b) actuating said valve means to communicate said syringe with said chamber, (c) actuating said plunger on said stem to move said plunger to the upper portion of the body of said syringe, (d) retaining said stem in said upper portion of said body of said syringe, (e) actuating said valve means to seal said chamber and vent said syringe to atmosphere, (f) actuating said plunger on said stem to move said plunger to the lower part of the body of said syringe, (g) actuating said valve means to communicate said syringe with said chamber, then selectively repeating steps (a) through (f) until a selected vacuum has been obtained, whereby said resin is infused into said break in said glass.

9. The invention of claim 8 wherein said provided flow regulator comprises a first body portion and a second body portion, said first and second body portions joined by fusion.

10. The invention of claim 8 wherein said provided flow regulator comprises a first body portion and a second body portion, said first and second body portions joined by an adhesive bond.

11. The invention of claim 8 wherein said provided flow regulator comprises a first body portion and a second body portion said first and second body portions joined by friction interfit.

* * * * *